(12) United States Patent
Goustiaux et al.

(10) Patent No.: US 10,072,165 B2
(45) Date of Patent: *Sep. 11, 2018

(54) INK COMPOSITION FOR DEFLECTED CONTINUOUS INK JET PRINTING NOTABLY ON ORGANIC POLYMERS SUBSTRATES

(71) Applicant: Dover Europe Sàrl, Vernier (CH)

(72) Inventors: Cécile Goustiaux, Saint Marcellin (FR); Antoine Bataille, Loriol sur Drôme (FR); Yannick Jean, Valence (FR)

(73) Assignee: DOVER EUROPE SÀRL, Vernier (CH)

( * ) Notice: Subject to any disclaimer, the term of this patent is extended or adjusted under 35 U.S.C. 154(b) by 248 days.

This patent is subject to a terminal disclaimer.

(21) Appl. No.: 15/067,793

(22) Filed: Mar. 11, 2016

(65) Prior Publication Data
US 2016/0264797 A1 Sep. 15, 2016

(30) Foreign Application Priority Data
Mar. 13, 2015 (FR) ...................................... 15 52078

(51) Int. Cl.
| | | |
|---|---|---|
| *C09D 11/04* | (2006.01) | |
| *C09D 11/102* | (2014.01) | |
| *C09D 11/30* | (2014.01) | |
| *C09D 11/38* | (2014.01) | |
| *C09D 11/52* | (2014.01) | |
| *C08J 7/04* | (2006.01) | |
| *C09D 11/104* | (2014.01) | |

(52) U.S. Cl.
CPC .............. *C09D 11/104* (2013.01); *C08J 7/047* (2013.01); *C09D 11/102* (2013.01); *C09D 11/30* (2013.01); *C09D 11/38* (2013.01); *C09D 11/52* (2013.01); *C08J 2323/06* (2013.01); *C08J 2323/12* (2013.01); *C08J 2367/02* (2013.01)

(58) Field of Classification Search
CPC ..... C09D 11/104; C09D 11/012; C09D 11/30; C09D 11/38; C09D 11/52; C08J 7/047; C08J 2323/06; C08J 2323/12; C08J 2367/02
USPC ........... 106/31.27, 31.41, 31.58, 31.6, 31.73, 106/31.86
See application file for complete search history.

(56) References Cited

U.S. PATENT DOCUMENTS

| | | | |
|---|---|---|---|
| 4,024,096 A | 5/1977 | Wachtel | |
| 4,153,593 A | 5/1979 | Zabiak | |
| 4,155,767 A | 5/1979 | Specht | |
| 4,155,895 A | 5/1979 | Rohowetz | |
| 4,166,044 A | 8/1979 | Germonprez | |
| 4,207,577 A | 6/1980 | Mansukhani | |
| 4,260,531 A | 4/1981 | Wachtel | |
| 4,465,800 A | 8/1984 | Bhatia | |
| 4,567,213 A | 1/1986 | Bhatia | |
| 4,756,758 A | 7/1988 | Lent | |
| 4,834,799 A | 5/1989 | Song | |
| 4,847,316 A * | 7/1989 | Schick ................... C08L 67/00 524/107 |
| 4,880,465 A | 11/1989 | Loria | |
| 4,883,714 A * | 11/1989 | Stockl ................. C09D 11/104 428/195.1 |
| 5,102,458 A | 4/1992 | Lent | |
| 5,274,025 A * | 12/1993 | Stockl ................. C09D 11/102 524/513 |
| 5,316,575 A | 5/1994 | Lent | |
| 5,395,431 A | 3/1995 | Siddiqui | |
| 5,395,432 A | 3/1995 | Nelson | |
| 5,587,405 A * | 12/1996 | Tanaka ................. C09D 11/101 106/31.43 |
| 5,594,044 A | 1/1997 | Yang | |
| 5,637,139 A | 6/1997 | Morelos | |
| 7,014,698 B2 | 3/2006 | Mizutani | |
| 7,022,172 B2 | 4/2006 | Ohkawa | |
| 7,132,013 B2 | 11/2006 | Mizutani | |

(Continued)

FOREIGN PATENT DOCUMENTS

| | | |
|---|---|---|
| EP | 0 034 881 A1 | 9/1981 |
| EP | 0 289 141 A2 | 11/1988 |

(Continued)

OTHER PUBLICATIONS

English translation of the European Search Report for EP 3067397, dated Jul. 5, 2016; 2 pages.*
English translation of the European Written Opinion for EP 3067397, dated Jul. 5, 2016; 3 pages.*
"Product Selection Rosin Resins" http://www.pinovasolutions.com/uploads/files/resources/pinova-product-selection-guide.pdf ,Oct. 1, 2014.

(Continued)

*Primary Examiner* — Helene Klemanski
(74) *Attorney, Agent, or Firm* — Pearne & Gordon LLP

(57) ABSTRACT

An ink composition for deflected continuous ink jet printing, liquid at room temperature, comprising: a solvent comprising, preferably consisting of, one or several organic solvent compound(s) and optionally water; a binder, comprising at least one polyester resin prepared by polymerization of terephthalic acid, isophthalic acid, neopentylglycol, and ethyleneglycol; optionally one or several dye(s) and/or pigment(s). A method for marking a substrate, support or object by projecting on a surface of this substrate, support, or object this ink composition. A substrate, support or object, notably a bottle, flask, tray, stopper, cable or pipe made of polyolefin, for example made of polyethylene or made of polypropylene, provided with a marking obtained by drying, and/or absorption into the substrate, support or object, of this ink composition.

38 Claims, No Drawings

(56) References Cited

U.S. PATENT DOCUMENTS

| | | | |
|---|---|---|---|
| 7,132,014 B2 | 11/2006 | Mizutani | |
| 8,282,724 B2* | 10/2012 | Goustiaux | C09D 11/38 106/31.58 |
| 9,546,289 B2* | 1/2017 | Goustiaux | C09D 11/102 |
| 2010/0101842 A1* | 4/2010 | Akiba | C09D 11/52 174/257 |

FOREIGN PATENT DOCUMENTS

| | | |
|---|---|---|
| EP | 0 510 752 A1 | 10/1992 |
| EP | 0 735 120 A2 | 10/1996 |
| FR | 2 460 982 A1 | 1/1981 |
| FR | 2 997 956 A1 | 5/2014 |
| GB | 2 277 094 A | 10/1994 |
| GB | 2 286 402 A | 8/1995 |
| GB | 2 298 713 A | 9/1996 |
| WO | 92/14794 A1 | 9/1992 |
| WO | 92/14795 A1 | 9/1992 |
| WO | 95/29287 A1 | 11/1995 |
| WO | 96/23844 A1 | 8/1996 |
| WO | 2014/076181 A1 | 5/2014 |

OTHER PUBLICATIONS

"Trackifier" http://en.wikipedia.org/wiki/Trackifier, Jan. 9, 2015.
U.S. Appl. No. 14/442,476, "Ink Composition for Continuous Deflected Ink Jet Printing Notably on Substrates made of Organic Polymer" filed May 13, 2015.
Search Report issued in French Patent Application No. FR 15 52078 dated Nov. 27, 2015.

* cited by examiner

INK COMPOSITION FOR DEFLECTED CONTINUOUS INK JET PRINTING NOTABLY ON ORGANIC POLYMERS SUBSTRATES

The invention relates to an ink composition for which the properties are particularly suitable for marking or printing with a liquid jet, and most particularly for marking with a deflected continuous ink jet.

The ink composition according to the invention may be used for marking substrates, supports and objects of any kinds.

The ink composition according to the invention is notably suitable for marking substrates, supports, and objects made of organic polymers, in particular made of thermoplastic polymers (<<plastic materials>>), such as polyolefins like polyethylenes (PE) or polypropylenes (PP), or further poly (ethylene terephthalate) (PET). The ink composition according to the invention is most particularly suitable for marking bottles, packages, flasks or trays made of organic polymers, notably made of polyolefins, such as polyethylenes or polypropylenes.

An opaque variant for example of white or pale color, of the ink composition according to the invention is also suitable for marking black substrates or of a dark color, for example for marking black tubes and cables or of dark color.

The ink composition according to the invention gives the possibility of obtaining markings notably resistant to friction and to customary solvents such as ethanol, and adherents i.e. successfully undergoing the detachment test with an adhesive tape.

Ink jet printing is a well-known technique, which allows printing, marking or decoration of any kinds of objects, at high speed, and without contact of these objects with the printing device, variable messages at will, such as bar codes, best before dates, etc. and this even on non-planar supports.

Ink jet printing techniques are divided in two great types, i.e.: the so-called "Drop on Demand" or (DOD) technique and the so-called "Continuous Ink Jet" or (CIJ) technique.

We shall be more particularly interested in the latter technique, more specifically in the deflected continuous jet technique.

Deflected continuous jet projection consists of sending under pressure ink in a cavity containing a piezo-electric crystal, wherefrom the ink escapes through an orifice (nozzle) as a jet.

The piezo-electric crystal, vibrating at a determined frequency, causes pressure perturbations in the ink jet, which oscillates and gradually breaks up into spherical drops or droplets. An electrode, placed on the path of the jet, there where it breaks up, gives the possibility of giving these drops an electrostatic charge, if the ink is conductive. The thereby charged drops are deflected in an electric field and allow printing. The non-charged drops, therefore not deflected, are recovered in a gutter where the ink is sucked up, and then recycled towards the ink circuit.

This type of ink jet projection ensures contactless marking at a high running speed over objects which are not necessarily planar and with the possibility of changing message at will.

The technique is particularly suitable for marking and identifying (expiry dates, series numbers, batch numbers, barcode numbers etc.) industrial products on production lines.

The ink compositions suitable for projection, printing, by the deflected continuous jet technique, have to meet a certain number of criteria inherent to this technique, relating, inter alia, to the viscosity, the electric conductivity, the solubility in a solvent for cleaning, the compatibility of the ingredients, the proper wetting of the supports to be marked, etc.

Particular and important criteria which should be met by the ink compositions for printing with the deflected continuous jet technique, stem from the fact that ink consumption is low when the number of printed characters per message is small, on the one hand, and from the fact that the jet is continuous and that ink recirculates many times before being projected on the other hand. Consequently, the ink is in contact with ambient air during the suction of non-deflected drops, and it may be led to absorbing ambient humidity or to reacting with the oxygen of the air, and it may thus be modified.

In spite of this situation, the ink will have to retain its essential properties both during storage, and during its circulation in the printer.

Finally, these inks should dry rapidly, be capable of passing through the nozzle without clogging it, with great stability of orientation of the jet while allowing easy cleaning of the print head.

The ingredients which make up present inks, for the ink jet of the deflected continuous jet type, are organic or mineral products; these are coloring materials, such as coloring agents or pigments, resins or binders, in more or less volatile solvent(s) or in water, optionally conductivity salt(s), as well as diverse additives.

The coloring materials are called <<dyes or pigments>>, depending on whether they are respectively soluble or insoluble in the solvent used.

Pigments, naturally insoluble, are therefore dispersed and may be opaque or not.

They provide the ink with its color, its opacity, or particular optical properties, such as fluorescence (cf. patents or patent applications U.S. Pat. No. 4,153,593, U.S. Pat. No. 4,756,758, U.S. Pat. No. 4,880,465, EP-A-0 289 141, U.S. Pat. No. 5,395,432, GB-A-2,298,713). In certain cases, the coloring agents also provide themselves sufficient conductivity to the ink so that there is no need to add a conductivity salt. The coloring agents known under the name of C. I. Solvent Black 27, 29, 35 and 45 are in this case.

The binder(s) or resin(s) is(are) generally mostly solid and polymeric compound(s) and their selection is dictated by their solubility in the selected solvents and by their compatibility with the coloring agents and the other additives, but also and especially according to the properties which they provide to the ink film, once it is dry (see patents and patent applications U.S. Pat. No. 4,834,799, GB-A-2,286, 402, U.S. Pat. No. 5,594,044, U.S. Pat. No. 5,316,575, WO-A-96/23844, WO-A-95/29287).

Their primary function is to provide the ink with adherence on the maximum of supports or on specific supports, for example non-porous supports. They also give the possibility of giving the ink the adequate viscosity for forming drops from the jet and they provide to the ink, or rather to the obtained marking, the essential of its properties of resistance to physical and/or chemical aggressions, in particular resistance to friction, to detachment with an adhesive tape ("Scotch®"), or the resistance to other customary solvents such as ethyl alcohol.

The solvents of these inks most frequently consist of a mixture comprising in majority an amount of volatile and not very viscous solvents on the one hand in order to allow very rapid drying of the markings and to adjust the viscosity to the desired value, for example from 2 to 10 mPa·s and, more viscous and less volatile solvents with slower drying, in a lesser amount on the other hand in order to avoid drying of the ink in the nozzle during the stopping phases of the printing apparatus (cf. patent or patent applications U.S. Pat. No. 4,155,767, WO-A-92 14794, WO-A-92 14 795 and U.S. Pat. No. 4,260,531).

The most often used volatile solvents are alcohols, ketones or esters with low molecular weight, as this is indicated in U.S. Pat. No. 4,567,213, and U.S. Pat. No. 5,637,139. From among these solvents, mention may essentially be made of methanol, ethanol, 1- and 2-propanol, acetone, methyl ethyl ketone ("MEK"), methyl isobutyl ketone, ethyl acetate, and tetrahydrofurane.

Less volatile solvents notably having a drying retardant function are most often ketones, such as cyclohexanone, glycol ethers, mentioned in documents U.S. Pat. No. 4,024,096 and U.S. Pat. No. 4,567,213, ethers and acetals, such as furane or dioxane, mentioned in document U.S. Pat. No. 4,155,767, dimethyl formamide or dimethylsulfoxide (U.S. Pat. No. 4,155,895), lactones (EP-A-O 034 881), N-methyl pyrrolidone (EP-A-0 735 120), glycols (WO-A-96 23844), and even aliphatic hydrocarbons (U.S. Pat. No. 4,166,044) or further water, alone or in combination with other solvents, mentioned above, on this subject reference will be made to documents U.S. Pat. No. 4,153,593, GB-A-2,277,094 and FR-A-2 460 982.

Generally, the main or majority solvents of the inks for projection with a deflected continuous jet should meet a certain number of criteria, in particular:
  their volatility should be sufficient so that the ink rapidly dries on the support to be marked, but not too large, so as not to evaporate too rapidly in the printer, in particular during the standstill phases;
  their solvent power, towards binders of the ink, dyes or pigment dispersions and towards supports to be printed, should give the possibility of giving good adherence to the dry ink;
  their effects on the health of persons, i.e. their toxicity, noxiousness, irritating nature and inflammability, should be reduced;
  they should give the possibility of maintaining sterile an ink optionally intended to be ingested;
  finally, they should have the capability of maintaining ion species dissolved and dissociated such as the salts which give the ink its electric conductivity.

The optional conductivity salt(s) provide(s) the ink with the conductivity required for electrostatic deflection. On this subject, reference may be made to document U.S. Pat. No. 4,465,800.

The additives comprise dispersants which allow dispersion of the pigments, surfactants which modify the wetting or penetrating power of the ink (U.S. Pat. No. 5,395,431), in particular those which modify or regulate the static or dynamic surface tension, such as Fluorad® FC 430 from 3M®, agents which inhibit corrosion induced by the salts which provide the aforementioned conductivity (see documents EP-A-0 510 752, U.S. Pat. No. 5,102,458), or further additives which protect the ink against proliferations of bacteria and of other micro-organisms: these are biocides, bactericides, fungicides and others, particularly useful in inks containing water, pH regulating buffers (see EP-A-0 735 120), anti-foaming agents.

Moreover, it is known that the traceability of products such as food, pharmaceutical or medical products require that diverse pieces of information should be printed on the package of these products.

Affixing markings on beverage bottles, or packages of cosmetic products, and notably on stoppers or bottles in plastic materials, for example made of polyolefins and notably made of polyethylene pose problems which are particularly difficult to solve, notably in the case when the markings should resist not only to the liquids contained in these packages, but also to the inevitable friction from the user.

In order to guarantee traceability of the production, the bottles are generally marked on the stopper or on the bottom of the bottle, or at any other location, with a corresponding piece of information, immediately after filling.

The deflected continuous ink jet technology is with marking with a $CO_2$ laser the most suitable technique for this high-rate marking on these curved surfaces, of variable information.

For such applications, the ink for deflected continuous jet printing and the deposited marking should meet particular requirements, which are notably the following:
  the ink should dry very rapidly when the production rates are significant;
  the marking should resist handling by the consumer during the whole duration for consuming the contents of the package, such as a bottle;
  the marking should resist to liquids contained in the packages such as alcoholic solutions;
  the marking should resist to friction;
  the marking should be adherent.

In order to test the adherence of the markings, the test with the adhesive tape a so-called <<Scotch® test>> is applied very commonly. It consists of applying an adhesive on the marking and then of removing this adhesive. The test is positive when the marking remains on the object and is not transferred to the adhesive.

In order to obtain adherence and also satisfactory resistance of the markings obtained with the ink compositions projected with an ink jet on the substrate, such as packages, made of organic polymers, notably made of plastic materials, and in particular on polyolefin substrates, for example made of polyethylenes or polypropylenes, it is presently necessary to carry out a surface treatment of the substrate such as a flame treatment or a corona treatment, and/or include in the ink composition halogenated compounds, notably chlorinated compounds such as resins based on vinyl chloride.

Therefore there exists a need for an ink composition for printing with the deflected continuous ink jet technique which gives markings having notably satisfactory adherence, or even improved adherence with respect to known ink compositions, on the substrates, such as cables, pipes or packages, made of organic polymers, notably made of plastic materials, and in particular on substrates made of polyolefins, for example made of polyethylenes or polypropylenes, without it being necessary to carry out a surface treatment of the substrate, like a flame treatment or a corona treatment, and/or include in the ink composition halogenated compounds, notably chlorinated compounds, like resins based on vinyl chloride.

Therefore, in particular, there exists a need for ink compositions for printing with the deflected continuous jet technique which gives markings having satisfactory adherence (generally determined by the so-called <<adhesive tape>> test), or even improved with respect to known ink compositions, on said substrates, but which are free of halogenated compounds, notably chlorinated compounds, like resins based on vinyl chloride, these ink compositions further give the possibility of obtaining more resistant markings, notably to friction and to alcohol.

The goal of the invention is to provide an ink composition suitable for deflected continuous ink jet printing which inter alia meets the whole of the needs, requirements and criteria indicated above, and which does not have the drawbacks, limitations, defects and disadvantages of the ink compositions of the prior art, and which overcomes the problems of the ink compositions of the prior art.

This goal and further others are achieved, according to the invention with an ink composition for deflected continuous ink jet printing, liquid at room temperature, comprising:

a) a solvent comprising, preferably consisting of, one or several organic solvent compound(s), and optionally water;

b) a binder, comprising at least one polyester resin prepared by polymerization of terephthalic acid, isophthalic acid, neopentyl glycol, and ethylene glycol;

c) optionally one or several dye(s) and/or pigment(s).

By <<room temperature>>, is generally meant a temperature from 5° C. to 30° C., preferably from 10° C. to 25° C., still preferably from 15° C. to 24° C., better from 20° C. to 23° C. It is quite obvious that the ink is liquid at atmospheric pressure.

Advantageously, said ink composition is free of halogenated compounds.

By <<free of halogenated compounds>>, is generally meant that the ink composition according to the invention comprises less than 0.1% by weight, or even 0% by weight, of the total weight of the ink composition, of halogenated compounds.

The ink composition according to the invention is notably free of chlorinated compounds, such as resins based on vinyl chloride such as poly(vinyl chloride) (PVC).

Let us specify that the electric conductivity is measured with a commercial instrument and according to the principle well-known to the man skilled in the art, for example described on the site: fr.wikipedia.org/wiki/Conductim%C3%A9trie.

The electric conductivity may be measured according to the following standard:

ASTM D1125-14: Standard Test Methods for Electrical Conductivity and Resistivity of Water.

The electric conductivity may be measured for example with a commercially available conductimeter of the Radiometer® Company.

The viscosity may be measured according to the following standard:

DIN 53019-1: Measurements of Viscosities and Flow Curves by Means of Rotational Viscometers.

The dynamic viscosities may be measured for example by means of a viscometer with coaxial cylinders, such as the viscometer with coaxial cylinders of the "Couette" type of the Contraves® Company.

The ink composition according to the invention is fundamentally distinguished from the ink compositions according to the prior art in that it comprises a binder, comprising at least one polyester resin, which is a highly specific resin prepared by polymerization of four specific monomers, i.e. terephthalic acid, isophthalic acid, neopentyl glycol and ethylene glycol.

The incorporation of such a polyester resin into the binder of an ink composition suitable for deflected continuous ink jet printing is neither described nor suggested in the prior art.

This polyester resin is specific in that it is prepared from 4 specific monomers, i.e. two specific diacids and two specific diols, all these monomers being present in the polymerization mixture and then forming the polyester resin.

These polyester resins prepared from two diacids and from 2 diols are amorphous and therefore soluble in organic solvents, contrary to crystalline polymers which are insoluble in organic solvents.

A polyester resin which may be included into the composition according to the invention is for example the resin available under the name of Vylon GK 250® from Toyobo Vylon. This polyester is actually a copolymer of at least both aforementioned diacids, i.e. terephthalic acid and isophthalic acid with at least both aforementioned diols, i.e. neopentyl glycol and ethylene glycol.

The ink composition according to the invention inter alia meets the needs and requirements mentioned above, and provides a solution to the problems of the ink compositions of the prior art.

According to the invention, it was notably seen surprisingly that the presence in the binder of the ink composition according to the invention of the specific polyester resin described above gave the possibility of obtaining ink compositions for ink jet printing with the deflected continuous ink jet technique which gives markings whose adherence (generally determined by the so-called <<adhesive tape>> test), on organic polymers, notably plastic materials, and in particular on polyolefins, for example polyethylenes or polypropylenes, is higher than the adherence of the markings obtained with the ink compositions of the prior art, and this without it being necessary to subject beforehand the substrate to a surface treatment and optionally to include halogenated compounds, such as resins based on vinyl chloride, in the ink composition.

The ink compositions according to the invention, for which the binder comprises the specific polyester resin described above surprisingly give also the possibility, of obtaining markings which are more resistant, notably to friction and to alcohol, in particular, on organic polymers, notably plastic materials, and in particular on polyolefins, for example polyethylenes or polypropylenes, than the markings obtained with the ink compositions of the prior art which do not comprise a binder containing the specific polyester resin described above.

It did not ensue obviously from the known ink compositions that the application in the binder of the specific polyester resin described above, could provide the markings with particularly good adherence notably on the substrates made of organic polymers, notably made of plastic materials, and in particular made of polyolefins, for example made of polyethylenes or polypropylenes, as well as excellent resistance to friction and to solvents like ethanol; this particularly good adherence as well as this excellent resistance to friction and to solvents being better than the adherence and resistance to friction obtained with ink compositions which do not comprise said specific polyester resin.

Advantageously, the binder of the ink composition according to the invention may further comprise a resin derived from rosin.

The resin derived from rosin may be a glycerol and rosin ester, for example the resin Bremasin®1380 from Kraemer®.

In this case, when the binder of the ink composition according to the invention further comprises a resin derived from rosin, the binder of the ink composition according to the invention is a highly specific binder which comprises a combination of two specific compounds i.e. the combination of a polyester resin, and of a resin derived from rosin which has never been described nor suggested in the prior art.

Advantageously, the binder of the ink composition according to the invention may further comprise a polyol resin.

By polyol resin is meant a resin including free hydroxyl groups OH.

The polyol resin may be a hydrogenated copolymer of acetophenone and of formaldehyde, like the resin Variplus SK® from Tego®.

In the case when the binder of the ink composition according to the invention further comprises a polyol resin, the binder of the ink composition according to the invention is a highly specific binder which comprises a combination of two specific compounds, i.e. a combination of a polyester resin and of a polyol resin which has never been described nor suggested in the prior art.

The binder of the composition according to the invention may comprise the specific polyester resin described above, the resin derived from rosin, and the polyol resin, i.e. all these three resins.

An ink composition for printing with a deflected continuous jet, the binder of which comprises the combination of these three specific resins, has never been described nor suggested in the prior art.

The ink composition according to the invention when it comprises a binder which comprises the specific polyester as described above and further a resin derived from rosin or a polyol resin, a fortiori, inter alia, meets the needs and requirements mentioned above, and provides a solution to the problems of the ink compositions of the prior art.

According to the invention, it was notably observed surprisingly that the specific combination of two specific compounds in the binder, i.e. the specific polyester resin described above, and a resin derived from rosin or a polyol resin, gave the possibility of obtaining ink compositions for printing with an ink jet, by the deflected continuous ink jet technique, which gives markings, the adherence of which (generally determined by the so-called <<adhesive tape>> test, on organic polymers, notably plastic materials, and in particular on polyolefins, for example polyethylenes or polypropylenes, is higher than the adherence of the markings obtained with the ink compositions of the prior art, but also generally higher than the adherence of the markings obtained with the ink compositions, the binder of which only comprises the aforementioned specific polyester resin, and this without it being necessary to subject beforehand the substrate to a surface treatment and optionally to include halogenated compounds, such as resins based on vinyl chloride, in the ink composition.

The ink compositions according to the invention, the binder of which comprises the combination of the specific polyester resin described above, and of a resin derived from rosin or of a polyol resin, also surprisingly gives the possibility of obtaining markings which are more resistant, notably to friction and to alcohol, in particular on organic polymers, notably plastic materials and in particular on polyolefins, for example polyethylenes or polypropylenes, than the markings obtained with the ink compositions of the prior art, but also generally than the markings obtained with the ink compositions, the binder of which only comprises the aforementioned specific polyester resin.

It did not ensue obviously from the known ink compositions that the combination of the 2 types of binder mentioned earlier, may provide the markings with particularly good adherence—and even further improved adherence with respect to the ink compositions, the binder of which only comprises the specific aforementioned polyester resin— notably on substrates made of organic polymers, notably made of plastic materials, and in particular made of polyolefins, for example made of polyethylenes or made of polypropylenes, as well as with an excellent resistance—and even a further improved resistance as compared with the ink compositions, the binder of which only comprises the aforementioned specific polyester resin- to friction and to solvents like ethanol.

The ink composition according to the invention when it comprises a binder which comprises the specific polyester as described above and further a resin derived from rosin and a polyol resin, i.e. the three aforementioned resins, a fortiori, inter alia, meets the needs and requirements mentioned above and provides a solution to the problems of the ink compositions of the prior art.

The ink composition for ink jet printing with the deflected continuous jet technique according to the invention when the binder comprises the specific combination of the three aforementioned specific resins, i.e. the polyester resin, the resin derived from rosin and the polyol resin, surprisingly gives the possibility of obtaining markings for which the adherence and the resistance, notably to friction are further improved with respect to the ink compositions, the binder of which only contains the polyester resin or the polyester resin combined with a resin derived from rosin or a polyol resin.

It did not ensue obviously from the known ink compositions that the combination of the 3 aforementioned resin types could provide the markings with particularly good— and even further improved adherence—notably on the substrates made of organic polymers, notably made of plastic materials, and in particular made of polyolefins, for example made of polyethylenes or polypropylenes, as well as with an excellent—and even further improved—resistance to friction and to solvents like ethanol.

Thus, document U.S. Pat. No. 4,207,577 describes opaque ink compositions for ink jet printing which comprise resins. Among the very many resins mentioned are incidentally mentioned polyester resins and rosin resins in a general way.

The exact nature of these polyester resins is not specified.

In particular, the highly specific polyester resin of the binder of the ink composition according to the invention is neither described nor suggested in this document.

Further, the particular combination of the specific polyester resin of the binder of the ink composition according to the invention, with a rosin resin and/or with a polyol resin is by no means described or suggested in this document.

Moreover, the ink composition of this document may also comprise chlorinated resins such as poly(vinyl chloride), poly(vinylidene chloride) and chlorinated rubbers.

Document U.S. Pat. No. 7,022,172 relates to an ink composition for ink jet printing which notably comprises a resin and a dispersant. Among the very many resins mentioned, rosin resins are incidentally mentioned. The dispersant is in particular a polyester-amine.

In this document there is no mention nor any suggestion that the ink composition which is described therein, may comprise a polyester, and even less the highly specific polyester, present in the ink composition according to the invention, in combination with a rosin resin.

Further there is no mention nor any suggestion in this document that the ink composition which is described therein, may further comprise a polyol resin such as the one advantageously present in the ink composition according to the invention.

Further, the ink composition of this document may comprise chlorinated resins like vinyl chloride-acetate resins.

Documents U.S. Pat. Nos. 7,132,014, 7,132,013, and 7,014,698 relate to pigmented ink compositions for ink jet printing which contain a pigment, a polymer and an organic solvent comprising a poly(alkylene glycol) derivative and a nitrogen-containing heterocyclic compound. The polymer may be a binder resin selected from acrylic resins, polyester resins, polyurethane resins, vinyl chloride resins and cellulose resins.

The exact nature of the polyester resin is not specified and there is no mention nor any suggestion in these documents that this polyester resin may be a specific polyester resin such as the one present in the ink composition according to the invention.

Further there is no mention or any suggestion in these documents, that the ink compositions which are described therein, may further comprise a resin derived from rosin such as the one advantageously present in the ink composition according to the invention.

Further there is no mention or any suggestion in these documents that the ink compositions which are described therein, may further comprise a polyol resin like the one advantageously present in the ink composition according to the invention.

Further, the ink compositions of these documents may comprise vinyl chloride resins.

According to a fundamental aspect of the invention, the ink compositions according to the invention give markings, resistant to friction, resistant to the adhesive tape (<<Scotch®>>) test, and to friction in the presence of alcohol.

Preferably, the ink compositions according to the invention do not contain any chlorinated compound like the resins based on vinyl chloride.

Advantageously, the ink composition according to the invention may comprise from 0.1% to 30% by weight, preferably from 5% to 20% by weight, of the total weight of the ink composition, of the polyester resin.

Advantageously, the ink composition according to the invention may comprise from 0.1% to 20% by weight, preferably from 1% to 15% by weight, of the total weight of the ink composition, of resin derived from rosin.

Advantageously, the ink composition according to the invention may comprise from 0.1% to 25% by weight, preferably from 2% to 10% by weight, of the total weight of the ink composition, of the polyol resin.

The binder comprises the polyester resin, optionally the resin derived from rosin and/or optionally the polyol resin.

Preferably, the binder may comprise all three resins, namely the polyester resin prepared by polymerization of terephthalic acid, isophthalic acid, neopentylglycol, and ethyleneglycol, the resin derived from rosin, and the polyol resin.

The binder may only comprise the polyester resin, optionally the resin derived from rosin, and/or optionally the polyol resin, i.e. the binder then consists of the polyester resin and, optionally of the resin derived from rosin and/or optionally of the polyol resin.

Thus, the binder may only consist of the polyester resin; or of the polyester resin and of the resin derived from rosin; or of the polyester resin and of the polyol resin; or of the polyester resin, of the resin derived from rosin and of the polyol resin.

Among the compositions in which the binder consists of the polyester resin, of the resin derived from rosin and of the polyol resin, the preferred compositions are those wherein the weight proportions of the different resins based on the total weight of the binder, in other words based on the total weight of all the resins, are as follows: 30% to 60% of the polyester resin, 20% to 50% of the resin derived from rosin, and 15% to 40% of the polyol resin.

Inside the limited domain defined by these narrow ranges of weight percentages of each of the resins based on the total weight of the binder, the properties of the markings obtained with the ink compositions according to the invention are optimal, in particular the adherence notably on polyethylene and on polypropylene of the markings and their resistance notably to alcohol are optimal.

Or else the binder may comprise, in addition to the polyester resin, the optional rosin resin and/or the optional polyol resin, one or several other optional polymer(s) and/or resin(s).

Advantageously, this or these other polymer(s) and/or resin(s) may notably be selected from (meth)acrylic, vinylic, ketonic, hydroxyaromatic, cellulosic, styrenic, epoxy, polyurethanes, styrene-acrylates, alkoxysilanes, and combinations of two or more of the latter.

Advantageously, the binder represents from 1% to 45% by weight, preferably from 5% to 30% by weight, still preferably from 10% to 20% by weight, of the total weight of the ink composition according to the invention.

The ink composition according to the invention comprises a very small amount of water, generally less than 10% by weight, preferably less than 5%, still preferably, less than 1% by weight, based on the total weight of the ink composition.

The ink composition according to the invention may even be considered as being essentially free of water (0% water).

In fact, the water present is only the provided water found as an impurity in the diverse components of the ink. The greater the degree of purity of the selected components, the smaller will be the water content.

The low content or lack of water in the ink composition according to the invention promotes the formation of the ink film when the binders and other coloring materials (dyes, pigments) of the composition are insoluble in water, thereby improving the resistance and adherence properties of the ink.

In the composition according to the invention, the solvent generally represents at least 20% by weight of the total weight of the ink composition, preferably the solvent represents from 30% to 90% by weight, still preferably from 60% to 80% by weight, of the total weight of the ink composition.

The solvent comprises, preferably consists of, one or several organic solvent compound(s) and optionally water provided that the amount of water observes the conditions indicated above.

Advantageously, said organic solvent compound(s) comprise(s) a majority weight proportion, based on the total weight of the solvent (50% by weight of the total weight of the solvent or more, or even up to 100% by weight of the total weight of the solvent), of one or several volatile organic solvent compound(s), and a minority weight proportion, based on the total weight of the solvent, of one or several non-volatile organic solvent compound(s).

Preferably, the solvent consists of one or several volatile organic solvent compound(s).

By <<volatile organic solvent compound>>, is generally meant that this compound has an evaporation rate of more than 0.5 on the scale where butyl acetate has an evaporation rate equal to 1.

Said organic solvent compound(s) being part of the solvent is(are) selected, for example from alcohols, in particular low molecular weight alcohols, for example aliphatic alcohols such as ethanol; ketones preferably with a low molecular weight; ethers of alkylene glycols; esters of alkylene glycols and esters of alkylene glycol ethers, such as acetates; dimethyl formamide; N-methyl pyrrolidone; acetals; esters; linear or cyclic ethers; aliphatic, cyclic or linear hydrocarbons; aromatic hydrocarbons; and carbonates such as propylene carbonate, ethylene carbonate and dimethyl- and diethyl-carbonates; and mixtures thereof.

Preferably, this or these solvent compound(s) has(have) the property of dissolving the other ingredients of the ink, notably the binder, the coloring materials, the additives, etc.

The alcohols will preferably be selected from linear or branched aliphatic alcohols with 1 to 8 carbon atoms, such as methanol, ethanol, propanol-1, propanol-2, n-butanol, butanol-2, tert-butanol, etc.

The ketones will preferably be selected from ketones with 3 to 10 carbon atoms, such as acetone, butanone (methylethyl-ketone), pentanone-2 (methyl-propyl-ketone), methyl-3 butanone-2 (methyl-isopropyl-ketone) and methyl-4 pentanone-2 (methyl-isobutyl-ketone).

The ethers of alkylene glycols are preferably selected from mono-alkyl ethers ($C_1$-$C_6$ alkyl group) or dialkyl ethers ($C_1$-$C_6$ alkyl groups) of alkylene glycol comprising from 1 to 10 carbon atoms in the alkylene chain, preferably these are ethers of ethylene or propylene glycol, such as methoxypropanol.

The esters of alkylene glycols and the esters of alkylene glycol ethers are preferably selected from among the esters of those with saturated aliphatic carboxylic acids with 1 to 6 carbon atoms, such as formic acid, acetic acid, propionic acid, butyric acid, valeric acid and caproic acid.

Mention may for example be made of methoxypropyl acetate, butyldiglycol acetate, etc.

The esters are preferably selected from low molecular mass esters such as formates, acetates, propionates or butyrates of alcohols with 1 to 10 carbon atoms.

The acetals are preferably selected from low molecular mass acetals such as ethylal and methylal.

The ethers are preferably selected from among low molecular mass ethers like dioxolane or tetrahydrofurane.

The man skilled in the art may easily identify from among these solvent compounds those which are volatile and those which are not volatile.

A preferred solvent according to the invention comprises a majority amount by weight based on the total weight of the solvent, preferably consists of one or several solvent compound(s) selected from ketones with 3 to 10 carbon atoms, such as acetone, butanone (methyl-ethyl-ketone or MEK), pentanone-2 (methyl-propyl-ketone), methyl-3 butanone-2 (methyl-isopropyl-ketone) and methyl-4 pentanone-2 (methyl-isobutyl-ketone or MIK).

A particularly preferred solvent comprises a majority amount by weight based on the total weight of the solvent, of MEK, preferably consists of MEK.

This preferred solvent may further comprise one or several other solvent compounds, other than the ketone(s) in a total minority amount by weight, based on the total weight of the solvent, for example in an amount from 0.1% to 20% by weight, preferably from 5% to 15% by weight, based on the total weight of the solvent, in order to optimize the properties of the inks. These minority solvents may be selected from esters, ethers of ethylene glycol or of propylene glycol, and from acetals.

The dye(s) and/or pigment(s) may be selected from all the dyes or pigments suitable for the use sought, known to the man skilled in the art, some of these pigments or dyes have already been mentioned above.

The dyes and the pigments will generally be selected from dyes and pigments known under the name of <<C. I. Solvent Dyes>> and <<C. I. Pigments>>.

As an example, of the most common pigments and dyes, mention may be made of C.I. Solvent Black 7, C. I. Solvent Black 29, C. I. Solvent Black 27, C. I. Solvent Black 28, C. I. Solvent Black 35, C. I. Solvent Blue 45, C. I. Solvent Blue 70, C. I. Solvent Red 124, dispersions of Pigment Blue 60, Pigment Black 7, Pigment White 6 or Pigment Blue 15; or further fluorescent dyes; and optical brighteners.

The pigments also include lacquers.

When it is desired that the markings obtained with the ink composition according to the invention be resistant to water, a dye will preferably be selected for which the solubility in water is the lowest, which is insoluble in water.

By <<dye insoluble in water>>, is generally meant a dye which, added 1% in demineralized water, does not cause coloration of the water visible to the eye.

Advantageously, the dye(s) is(are) selected from organic dyes soluble in ketones.

Advantageously, the pigment(s) may be selected from carbon blacks, titanium oxides, and mixtures thereof.

A preferred dye is C.I. Solvent Black 27.

The ink composition may be black or of a dark color.

Such a composition for example contains as a dye Solvent Black 27.

Such a composition will give a black marking or a marking having a dark color and is therefore particularly well adapted to the marking of white substrates or of a substrate having a light color.

Or else, according to an alternative, the ink composition may be opaque, preferably white or of a light color.

Such an opaque composition for example contains, as a pigment, titanium oxide $TiO_2$.

Such a composition will give a white or light color marking and is therefore particularly well adapted to the marking of black substrates or substrates having a dark color such as cables or pipes.

The total amount of dye(s) and/or pigment(s) is generally from 0.05% to 25% by weight, preferably from 1% to 20% by weight, still preferably from 3% to 10% by weight, of the total weight of the ink composition.

The ink composition may further comprise one or several plasticizers (of resin(s) or polymer(s) or compounds of the binder) for example selected from plasticizers known to the man skilled in the art and selected according to the binder used comprising one or several polymer(s) and/or resin(s), mention may be made as a plasticizer, for example of thermoplastic polyurethanes, phthalates, adipates, citrates and esters of citric acid, alkyl phosphates, glycerol, lactic acid, oleic acid, polypropylene glycol, fatty acid triglycerides, levulinic acid; and mixtures thereof.

The plasticizer(s) is(are) generally present in an amount of at least 0.05% by weight, preferably from 0.1% to 20% by weight, of the total weight of the ink composition.

The ink composition according to the invention may further optionally comprise at least one conductivity salt.

Indeed, as the ink composition according to the invention may be applied with a deflected continuous jet, it should have sufficient electric conductivity generally greater than 5 µS/cm at 20° C., preferably greater than or equal to 300 µS/cm at 20'C, still preferably greater than or equal to 500 µS/cm at 20° C.

The conductivity of the ink composition according to the invention may for example be from 5 to 5,000 µS/cm at 20° C., notably from 500 to 2,000 µS/cm at 20° C.

The products providing the ink with the conductivity required for projection with a continuous jet are ionizable compounds, such as salts. It is possible that dyes, pigments, or other ingredients of the ink are themselves salts and gives sufficient conductivity to the ink so that there is no need to add a conductivity salt strictly speaking: this is notably the case of compounds known under the name of <<C. I. Solvent Black 27, 29, 35 and 45>>, already mentioned.

However, it will often be necessary to include in the ink composition, additionally a conductivity salt different from the dyes, pigments and other ingredients.

By "conductivity salt", is meant a salt which provides electric conductivity to the ink composition.

This(these) conductivity salt(s) is(are) generally selected from alkaline metals, earth-alkaline metals and simple or quaternary ammonium salts, as nitrates, thiocyanates, formates, acetates, sulfates, propionates, hexafluorophosphates, hexafluoroantimonates etc.

When the markings obtained with the ink composition have to be resistant to water, this or these conductivity salts will be selected from those which are insoluble in water (i.e. generally, for which the solubility in water is less than 0.5% by weight), like quaternary ammoniums with a fatty chain and hexafluorophosphates or hexafluoroantimonates.

This(these) conductivity salt(s) will therefore be present, if necessary, in the ink composition so as to impart to the ink the conductivity above, in an amount generally of at least 0.05% by weight, preferably from 0.1% to 20% by weight, still preferably from 0.1% to 10% by weight, and better from 0.1% to 5% by weight, of the total weight of the ink composition.

The composition according to the invention may further comprise one or several additive(s) selected from compounds which improve the solubility of certain of these components, the printing quality, the adherence, or further the control of the wetting of the ink on various supports.

The additive(s) may be selected, for example from anti-foam agents; chemical stabilizers; UV stabilizers; surfactants, such as Fluorad® FC 430 or Byk® 333; agents inhibiting corrosion by salts such as conductivity salts; bactericides, fungicides and biocides; and pH regulating buffers, etc.

The additive(s) is (are) used at vary small doses, generally less than or equal to 5% and sometimes as low as 0.01%, depending on whether these are anti-foam agents, stabilizers or surfactants.

The invention further relates to a method for marking a substrate, support, or object by projecting on a surface of this substrate, support, or object an ink composition by the deflected continuous ink jet technique, in which the projected ink composition is the ink composition according to the invention as described in the foregoing.

Generally, before projecting the ink composition, the surface of the substrate, support or object is not subject to any surface treatment other than simple cleaning. In other words, the surface is not subject to any activation treatment.

The invention also relates to a substrate, support, or object provided with a marking obtained by drying, and/or absorption in the substrate, support, or object of the ink composition according to the invention.

This substrate may be porous or non-porous.

This substrate may be made of metal, for example made of aluminium, made of steel; made of glass; made of ceramic; made of a material containing cellulose such as paper, optionally coated or glossy, cardboard or wood; made of an organic polymer, notably made of a thermoplastic polymer, preferably selected from PVCs, PETs, polyolefins, such as polyethylenes (PE), and polypropylenes (PP); made of Poly(Methyl Methacrylate) (PMMA) also-called "Plexiglas"; made of fabric; or made of any other non-porous or porous substance, or made of a composite of several of the previous materials.

A preferred substrate is a substrate made of polyolefin, for example made of polyethylene or made of polypropylene.

The substrate, support or object may be a package or a container, such as a bottle, a flask or a tray; a stopper, plug or cap; a pipe or a cable; preferably made of a polyolefin, for example made of a polyethylene or made of a polypropylene.

The substrate may have any color.

Thus it may be white, of a light color or else black, of a dark color.

The color of the ink composition, and therefore notably the color of the pigment or dye of the ink composition, is generally selected so that the marking obtained with the ink composition has a color which is distinguished from the color of the substrate and more exactly from the color of the surface of the substrate provided with the marking.

As this was already indicated above, a black or dark colored ink composition, which gives a black or dark colored marking, is particularly well adapted to the marking of white substrates or of substrates with a light color.

On the other hand, an opaque ink composition, preferably white or of a light color, which gives a white marking or with a light color is particularly well adapted to the marking of black substrates or of substrates with a dark color such as cables or pipes.

The substrate, or rather the surface of the substrate, provided with the marking, may have any shape, even a complex shape, this may notably be a curved surface for example the surface of a package or container, such as a bottle, a flask or a tray, or the surface of a stopper, plug or cap, or further of the surface of a pipe or a cable.

Markings, prints of excellent quality and resistant on all the substrates even very little porous substrates, in particular on substrates made of polyolefins, for example made of polyethylene, even with complex shapes such as packages or containers such as bottles, flasks or trays; or stoppers; or further pipes or cables; made of a polyolefin, for example made of a polyethylene or made of a polypropylene are obtained.

The invention will be better understood upon reading the following description of embodiments of the invention, given as illustrative and non-limiting examples.

EXAMPLES

The following ink compositions, according to the invention, were prepared by mixing the products mentioned in table I below, in the indicated proportions. The viscosities of the obtained inks are also given in Table I below.

The electric conductivity could be measured with a commercially available conductimeter of the Radiometer® company.

The dynamic viscosities have been measured by means of a viscometer with coaxial cylinders of the "Couette" type of the Contraves® company.

TABLE I

| Constituents (weight percentages) | Example No. 1 | Ex. No. 2 | Ex. No. 3 | Ex. No. 4 | Ex. No. 5 | Ex. No. 6 | Ex. No. 7 | Ex. No. 8 | Ex. No. 9 | Ex. No. 10 | Ex. No. 11 |
|---|---|---|---|---|---|---|---|---|---|---|---|
| Methyl-ethyl ketone | 72.5 | 58 | 53.8 | 54 | 62 | 56.8 | 53.8 | 53.8 | 53.8 | 57.8 | 57.8 |
| Dowanol PMA ® | | 3 | 3 | 3 | 4 | 4 | 3 | 3 | 3 | 3 | 3 |
| Polyester resin (Vylon GK 250 ® from Toyobo) | 12.4 | 10 | 9 | 10 | 13 | 10 | 7 | 7 | 7.9 | 9 | 10.1 |
| Rosin resin (Bremasin 1380 ® from Kraemer ®) | 8 | 8 | 7 | 8 | | | 10.6 | 8.4 | 5.5 | 3.6 | 4.3 |
| Polyol resin (Synthetic resin SK from Evonik ®) | | | 6 | 4 | | 8 | 4.4 | 6.6 | 8.6 | 5.4 | 3.6 |
| Dispersion of TiO$_2$ at 65 in methyl-ethylketone | | 20 | 20 | 20 | 20 | 20 | 20 | 20 | 20 | 20 | 20 |
| Solvent Black 27 (black Neozapon ® X51) | 6 | | | | | | | | | | |
| BYK UV3500 ® | 0.7 | | | | | | | | | | |
| Potassium thiocyanate | 0.4 | 1 | 1.2 | 1 | 1 | 1.2 | 1.2 | 1.2 | 1.2 | 1.2 | 1.2 |
| Viscosity (mPa · s) | 4.35 | 4.03 | 4.84 | 5.04 | 4.42 | 4.32 | 3.97 | 3.9 | 4.89 | 3.73 | 4.2 |

The ink of Example 1 is an ink of black color since it contains Solvent Black 27.

The ink of Examples 2 to 11 is an opaque ink of white color since it contains TiO$_2$.

The black ink of Example 1 was deposited by means of printers Markem-Imaje® 9040, which use the deflected continuous ink jet technique, on polyethylene flasks.

On identical flasks, made of polyethylene (HDPE) and made of polypropylene, the comparative black ink Markem-Imaje® referenced 5513 was deposited by means of Markem-Imaje® 9040 printers. This ink is used a control, as a comparative ink, since it is presently used for this application for marking flasks made of polyethylene or made of polypropylene.

This comparative ink does not comprise any polyester resin, and further it does not comprise any rosin resin, or polyol resin.

After 24 hours of drying, the markings on the polyethylene flasks were successively:
- rubbed with a finger by performing 10 (30) back and forth movements ("BFM");
- subject to soaking for a few minutes in water and the same rubbing test was repeated by carrying out as many as 30 back and forth movements;
- rubbed with a cotton impregnated with ethanol by carrying out up to 30 back and forth movements;
- subject to the <<Scotch tape>> test as already described above.

The white inks of Examples 2 to 11 were deposited by means of Markem-Imaje® 9040 printers, which use the deflected continuous ink jet technique, on polyethylene cables of dark color and on other supports made of polypropylene with a dark color.

On identical cables, made of polyethylene (HDPE) and made of polypropylene, a comparative white ink Markem-Imaje® referenced as 5137 was deposited by means of Markem-Imaje® 9040 printers. This ink is used as a control, a comparative ink, since it is presently used for this application for marking cables or tubes made of polyethylene or made of polypropylene.

This comparative ink does not comprise any polyester resin, and it further does not comprise any rosin resin, or polyol resin.

After 24 hours of drying, the markings on the polyethylene cables and on the polypropylene supports were successively:
- rubbed with a finger by performing 30 back and forth movements;
- subject to soaking for a few minutes in water and the same rubbing test was repeated by performing up to 30 back and forth movements;
- rubbed with a cotton impregnated with ethanol by carrying out up to 30 back and forth movements (BFM);

If the marking is already erased by carrying out a number of back and forth movements of less than 30, the number of (back and forth movements) ("BFM") for Example 3, 5, 8, or 10 is then noted so that the marking is erased.
- subject to the "Scotch tape" test as it has already been described above.

The results are summarized in the following Table II:

TABLE II

| | | TESTED INKS | | | | | | | | | | | |
|---|---|---|---|---|---|---|---|---|---|---|---|---|---|
| | | Example No. 1 | Comparative Ex. 1: Ink 5513 | Ex No. 2 | Ex. No. 3 | Ex. No. 4 | Ex No. 5 | Ex No. 6 | Ex. No. 7 | Ex No. 8 | Ex No. 9 | Ex No. 10 | Ex No. 11 | Comparative Ex 2: Ink 5137 |
| HDPE bottle or cable | Rubbing | 5 | 5 | 5 | 5 | 5 | 5 | 5 | 5 | 5 | 5 | 5 | 5 | 5 |
| | Scotch tape | 4 | 5 | 0 | 3 | 2 | 0.5 | 0.5 | 0.5 | 2 | 2 | 3 | 3 | 0 |
| | Rubbing Ethanol | 5 | 0 | 8 BFM | 5 BFM | 8 BFM | 10 BFM | 5 BFM | 3 BFM | 4 BFM | 30 BFM | 5 BFM | 10 BFM | 10 BFM |
| | Rubbing H$_2$O | 5 | 5 | 5 | 5 | 5 | 5 | 5 | 5 | 5 | 5 | 5 | 5 | 5 |

TABLE II-continued

TESTED INKS

| | | Example No. 1 | Comparative Ex. 1: Ink 5513 | Ex No. 2 | Ex. No. 3 | Ex. No. 4 | Ex No. 5 | Ex No. 6 | Ex. No. 7 | Ex No. 8 | Ex No. 9 | Ex No. 10 | Ex No. 11 | Comparative Ex 2: Ink 5137 |
|---|---|---|---|---|---|---|---|---|---|---|---|---|---|---|
| PP Support | Rubbing | 5 | 5 | 5 | 5 | 5 | 5 | 5 | 5 | 5 | 5 | 5 | 5 | 5 |
| | Test with the adhesive tape Scotch | 4 | 5 | 0 | 3 | 3 | 0 | 0.5 | 3 | 3 | 2 | 2 | 2 | 0 |
| | Rubbing $H_2O$ | 5 | 5 | 5 | 5 | 5 | 5 | 5 | 5 | 5 | 5 | 5 | 5 | 5 |

The results of the tests were scored on a score scale ranging from 1 to 5.
Note:
5 = unchanged marking
4 = 20% damaged marking
3 = 50% damaged or erased marking
2 = 80% damaged or erased marking
1 = totally erased marking
Or else number of back and forth movements (BFM) so that the marking is erased when the marking is already erased by a number of back and forth movements of less than 30.

The black ink of Example 1 according to the invention shows better performances than the comparative black ink 5513 and the white inks of Examples 2 to 11 according to the invention show better performances than the comparative white ink 5137.

The invention claimed is:

1. An ink composition for deflected continuous ink jet printing, liquid at room temperature, comprising:
   a) a solvent comprising one or several organic solvent compound(s) and optionally water;
   b) a binder comprising at least one polyester resin prepared by polymerization of terephthalic acid, isophthalic acid, neopentylglycol, and ethyleneglycol;
   c) optionally one or several dye(s) and/or pigment(s).

2. The ink composition according to claim 1, which is free of halogenated compounds.

3. The ink composition according to claim 1, further comprising a resin derived from rosin.

4. The ink composition according to claim 1, further comprising a polyol resin.

5. The ink composition according to claim 1, which comprises from 0.1% to 30% by weight of the total weight of the ink composition, of the polyester resin.

6. The ink composition according to claim 3, which comprises from 0.1% to 20% by weight of the total weight of the ink composition, of the resin derived from rosin.

7. The ink composition according to claim 4, which comprises from 0.1% to 25% by weight of the total weight of the ink composition, of the polyol resin.

8. The ink composition according to claim 1, wherein the binder comprises the polyester resin prepared by polymerization of terephthalic acid, isophthalic acid, neopentylglycol, and ethyleneglycol, a resin derived from rosin, and a polyol resin.

9. The ink composition according to claim 8, wherein the binder consists of the polyester resin, the resin derived from rosin and the polyol resin.

10. The ink composition according to claim 1, comprising less than 10% by weight of water based on the total weight of the ink composition.

11. The ink composition according to claim 1, wherein the solvent represents at least 20% by weight of the total weight of the ink composition.

12. The ink composition according to claim 1, wherein said organic solvent compound(s) comprise(s) a majority weight proportion, based on the total weight of the solvent, of one or several volatile organic solvent compound(s) and a minority weight proportion, based on the total weight of the solvent, of one or several non-volatile organic solvent compound(s).

13. The ink composition according to claim 1, wherein the solvent comprises a majority amount by weight, based on the total weight of the solvent, of one or several solvent compound(s) selected from ketones with 3 to 10 carbon atoms.

14. The ink composition according to claim 13, further comprising one or several other solvent compound(s), other than the ketone(s) in a minority total amount by weight based on the total weight of the solvent.

15. The ink composition according to claim 1, wherein said dye(s) and/or pigment(s) is(are) selected from <<C. I. Solvent Dyes>> and <<C. I. Pigments>>; fluorescent dyes; and optical brighteners.

16. The ink composition according to claim 1, which is black or of a dark color.

17. The ink composition according to claim 1, which is opaque.

18. The ink composition according to claim 1, wherein the total amount of dye(s) and/or of pigment(s) is from 0.05% to 25% by weight of the total weight of the ink composition.

19. The ink composition according to claim 1, further comprising one or several plasticizers.

20. The ink composition according to claim 1, which has an electric conductivity greater than 5 μS/cm at 20° C.

21. The ink composition according to claim 1, further comprising at least one conductivity salt.

22. The composition according to claim 21, wherein the conductivity salt(s) is (are) present in an amount of at least 0.05% by weight of the total weight of the ink composition.

23. The ink composition according to claim 1, further comprising one or several additives selected from anti-foam agents; chemical stabilizers; UV stabilizers; surfactants; agents inhibiting corrosion by salts; bactericides, fungicides and biocides; and pH regulating buffers.

24. A method for marking a substrate, support or object, comprising projecting an ink composition by the deflected continuous ink jet technique onto a surface of the substrate, support, or object, wherein the projected ink composition is the ink composition according to claim 1.

25. The method according to claim 24, wherein, before projecting the ink composition, the surface of the substrate, support, or object is not subject to any surface treatment other than simple cleaning.

26. A substrate, support, or object provided with a marking obtained by drying, and/or absorption in the substrate, support, or object, of the ink composition according to claim 1.

27. The substrate, support or object, according to claim 26 which is made of metal; made of glass; made of ceramic; made of a material containing cellulose; made of an organic polymer; made of Poly(Methyl Methacrylate) (PMMA); made of fabric; or made of any other non-porous or porous substance; or made of a composite of several of the previous materials.

28. The substrate, support or object according to claim 27, which is a package or a container; a stopper; a pipe or a cable.

29. The ink composition according to claim 1, the solvent consisting of one or several organic solvent compound(s), and optionally water.

30. The ink composition according to claim 9, the polyester resin, the resin derived from rosin, and the polyol resin present in the following weight proportions based on the total weight of the binder: 30% to 60% of the polyester resin, 20% to 50% of the resin derived from rosin, and 15% to 40% of the polyol resin.

31. The ink composition according to claim 12, wherein said organic solvent compound(s) consists of one or several volatile organic solvent compound(s).

32. The ink composition according to claim 13, wherein the solvent consists of one or several compound(s) selected from ketones with 3 to 10 carbon atoms.

33. The ink composition according to claim 32, wherein the ketones with 3 to 10 carbon atoms are selected from the group consisting of acetone, butanone (methyl ethyl ketone or MEK), pentanone 2 (methyl propyl ketone), methyl-3-butanone-2 (methyl-isopropylketone), and methyl 4-pentanone 2 (methyl isobutyl ketone or MIK).

34. The ink composition according to claim 13, wherein the ketones with 3 to 10 carbon atoms are selected from the group consisting of acetone, butanone (methyl ethyl ketone or MEK), pentanone 2 (methyl propyl ketone), methyl-3-butanone-2 (methyl-isopropylketone), and methyl 4-pentanone 2 (methyl isobutyl ketone or MIK).

35. The ink composition according to claim 15, wherein the <<C. I. Solvent Dyes>>and <<C. I. Pigments>> are selected from the group consisting of C. I. Solvent Black 29, C. I. Solvent Black 27, C. I. Solvent Black 7, C. I. Solvent Black 28, C. I. Solvent Black 35, C. I. Solvent Blue 45, C. I. Solvent Blue 70, C. I. Solvent Red 124, dispersions of Pigment Blue 60 or Pigment Blue 15, Pigment Black 7, and Pigment White 6.

36. The ink composition according to claim 17, which is white or of a light color.

37. The ink composition according to claim 21, the at least one conductivity salt selected from conductivity salts insoluble in water.

38. The substrate, support or object according to claim 28, which is made of a polyolefin.

\* \* \* \* \*